(12) United States Patent
Yoo et al.

(10) Patent No.: US 10,572,044 B2
(45) Date of Patent: Feb. 25, 2020

(54) TOUCH-TYPE DISPLAY PANEL AND SHORT-REPAIR METHOD THEREOF

(71) Applicant: LG Display Co., Ltd., Seoul (KR)

(72) Inventors: JunWook Yoo, Daegu (KR); TaeHoon Kim, Daegu (KR); JeongKil Seo, Gyeongsangbuk-do (KR); Jinsoo Chung, Paju-si (KR); DongHoon Lee, Daegu (KR)

(73) Assignee: LG Display Co., Ltd., Seoul (KR)

( * ) Notice: Subject to any disclaimer, the term of this patent is extended or adjusted under 35 U.S.C. 154(b) by 97 days.

(21) Appl. No.: 15/795,845

(22) Filed: Oct. 27, 2017

(65) Prior Publication Data

US 2018/0120994 A1 May 3, 2018

(30) Foreign Application Priority Data

Oct. 31, 2016 (KR) .................. 10-2016-0143649

(51) Int. Cl.
   *G06F 3/041* (2006.01)
   *G06F 3/044* (2006.01)
   *G06F 3/047* (2006.01)

(52) U.S. Cl.
   CPC ............ *G06F 3/0412* (2013.01); *G06F 3/044* (2013.01); *G06F 3/047* (2013.01); *G06F 2203/04112* (2013.01)

(58) Field of Classification Search
   None
   See application file for complete search history.

(56) References Cited

U.S. PATENT DOCUMENTS

| | | | |
|---|---|---|---|
| 9,164,337 B1 | 10/2015 | Chen | |
| 2012/0081300 A1* | 4/2012 | Chan | G06F 3/044 345/173 |
| 2012/0105381 A1 | 5/2012 | Lee et al. | |
| 2012/0229395 A1* | 9/2012 | Shin | G06F 3/0418 345/173 |
| 2013/0033455 A1* | 2/2013 | Jeong | G06F 3/042 345/175 |
| 2015/0022513 A1* | 1/2015 | Kim | G09G 3/3225 345/212 |
| 2015/0348480 A1* | 12/2015 | Ishibashi | G09G 3/3648 345/206 |

(Continued)

FOREIGN PATENT DOCUMENTS

| | | |
|---|---|---|
| EP | 2 228 681 A1 | 9/2010 |
| EP | 2 985 682 A1 | 2/2016 |

OTHER PUBLICATIONS

The Extended European Search Report dated Mar. 1, 2018, for corresponding European Application No. 17 19 9093.0.

*Primary Examiner* — Brian M Butcher
(74) *Attorney, Agent, or Firm* — Morgan, Lewis & Bockius LLP

(57) ABSTRACT

A touch-type display panel includes an array substrate including a plurality of sub-pixels defined by gate lines and data lines; a plurality of touch electrodes disposed to cover the sub-pixels; two or more touch driving lines that electrically connect a touch driving circuit to a respective one of the touch electrodes; and a connection line disposed on both sides of the one of the touch electrodes and configured to electrically connect the two or more touch driving lines.

14 Claims, 10 Drawing Sheets

(56) References Cited

U.S. PATENT DOCUMENTS

2016/0109994 A1* 4/2016 Liu ...................... G06F 3/0412
                                                                            345/174
2016/0170544 A1* 6/2016 Wang ................... G06F 3/0416
                                                                            345/173
2016/0291769 A1   10/2016 Wang \* cited by examiner

TOUCH-TYPE DISPLAY PANEL AND SHORT-REPAIR METHOD THEREOF

CROSS-REFERENCE TO RELATED APPLICATIONS

This application claims priority from Korean Patent Application No. 10-2016-0143649, filed on Oct. 31, 2016, which is hereby incorporated by reference for all purposes as if fully set forth herein.

BACKGROUND

Technical Field

The present disclosure relates to a display panel of a display device, and more particularly, to a touch-type display panel of a display device in which a touch electrode is positioned, and a short-repair method thereof.

Description of the Related Art

With progress of the information-oriented society, various types of demands for display devices for displaying an image are increasing. Various types of display devices such as a liquid crystal display (LCD), a plasma display panel (PDP), and an organic light emitting diode display device (OLED) have been used.

From among these display devices, the LCD includes an array substrate including a thin film transistor, an upper substrate including a color filter and/or a black matrix, and a liquid crystal material layer formed therebetween, and alignment in the liquid crystal layer is adjusted by an electric field applied between two electrodes in a pixel area so as to adjust light transmittance, and, thus, an image is displayed.

The display panel in the LCD is defined by an active area AA that provides an image to a user and a non-active area NA that is a peripheral area of the active area AA. The display panel is typically manufactured by bonding a first substrate, serving as an array substrate on which a thin film transistor is formed and a pixel area is defined, and a second substrate, serving as an upper substrate on which a black matrix and/or a color filter layer are formed.

The array substrate or first substrate on which the thin film transistor is formed includes a plurality of gate lines GL extended in a first direction and a plurality of data lines DL extended in a second direction that is perpendicular to the first direction, and each pixel P is defined by a gate line and a data line. Within a pixel area P, one or more thin film transistors are formed, and a gate or source electrode of each of the thin film transistors may be connected to a gate line and a data line.

Also, the array substrate or first substrate includes a gate driver (driving circuit) or a data driving circuit provided in the non-active area or outside the panel in order to supply a gate signal and a data signal, required for driving each pixel, to each gate line and each data line.

Particularly, in the non-active area of the display panel, various signal lines for supplying voltage signals, clock signals, etc. may be formed and in some cases, a gate-in-panel (hereinafter, also referred to as "GIP")-type gate driving circuit included within the panel may be formed.

Meanwhile, in recent years, a display panel often has a touch function for sensing a touch input with a stylus pen or a user's finger. A display panel manufactured by separately preparing a touch screen and installing the touch screen on the display panel, a touch integrated display panel manufactured including a touch electrode and the like required for touch recognition within the display panel, and the like have been developed.

Meanwhile, in the touch integrated display panel, there may occur a short defect in which a touch driving line connecting the touch electrode and a touch driver is shorted to a touch electrode besides its corresponding touch electrode.

In this case, touch driving lines on both sides of the touch electrode where the short defect occurs may be repaired, but the repaired touch driving lines have a change in electric resistance, which may cause degradation of touch performance.

SUMMARY

Accordingly, the present embodiments are directed to a touch-type display panel and short-repair method thereof that substantially obviate one or more of the problems due to limitations and disadvantages of the related art.

An object of the present embodiments is to provide a touch-type display panel capable of suppressing degradation of touch performance caused by a short between a touch electrode and a touch driving line.

Another object of the present embodiments is to provide a touch-type display panel capable of reducing and/or minimizing a change in electric resistance after a repair for a shorted touch electrode by providing a connection line electrically connecting two or more touch driving lines in a touch integrated display panel including the two or more touch driving lines.

Yet another object of the present embodiments is to provide a touch electrode short-repair method in a touch-type display panel in which two or more touch driving lines are assigned to each touch electrode and electrically connected by a connection line. In the touch electrode short-repair method, if a short occurs between a touch driving line and another touch electrode, the shorted touch driving line is cut from both sides of the shorted touch electrode, and, thus, a change in electric resistance of the shorted touch driving line can be reduced and/or minimized even after a repair so as to suppress degradation of touch performance.

Additional features and advantages of the embodiments will be set forth in the description which follows, and in part will be apparent from the description, or may be learned by practice of the embodiments. The objectives and other advantages of the embodiments will be realized and attained by the structure particularly pointed out in the written description and claims hereof as well as the appended drawings.

To achieve these and other advantages and in accordance with the purpose of the present embodiments, as embodied and broadly described, the touch-type display panel and short-repair method thereof include a touch-type display panel, comprising an array substrate including a plurality of sub-pixels defined by gate lines and data lines; a plurality of touch electrodes disposed to cover the sub-pixels; two or more touch driving lines that electrically connect a touch driving circuit to a respective one of the touch electrodes; and a connection line disposed on both sides of the one of the touch electrodes and configured to electrically connect the two or more touch driving lines.

In another aspect, there is provided a short-repair method of a touch-type display panel including an array substrate on which a plurality of touch electrodes, a touch driver, two or more touch driving lines electrically connecting the touch driver to a respective one of the touch electrodes, and a connection line disposed on both sides of the one of the touch electrodes and electrically connecting the two or more touch driving lines, the short-repair method comprising sensing a short in which one of the touch driving lines corresponding to the one of the touch electrodes is electrically connected to another touch electrode; and cutting the shorted touch driving line from both sides of the other shorted touch electrode.

In another aspect, there is provided a touch-type display panel, comprising an array substrate including a plurality of sub-pixels defined by gate lines and data lines; a plurality of touch electrodes disposed to cover the sub-pixels; a first touch driving line and a second touch driving line electrically connecting a touch driving circuit to a respective one of the touch electrodes; and a connection line disposed on both sides of the one of the touch electrodes and configured to electrically connect the first and second touch driving lines, wherein the array substrate includes a short in which the first touch driving line corresponding to the one of the touch electrodes is electrically connected to another touch electrode, and wherein the shorted first touch driving line is cut from both sides of the another touch electrode such that the entire second touch driving line, a remaining part of the first touch driving line other than the cut part of the first touch driving line, and a connection line disposed on both sides of the other touch electrode are electrically connected to each other and the cut part of the first touch driving line is electrically floated.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the present disclosure and are incorporated in and constitute a part of this specification, illustrate embodiments of the present disclosure and together with the description serve to explain the principles of the disclosure. In the drawings.

DETAILED DESCRIPTION

Figure 1:
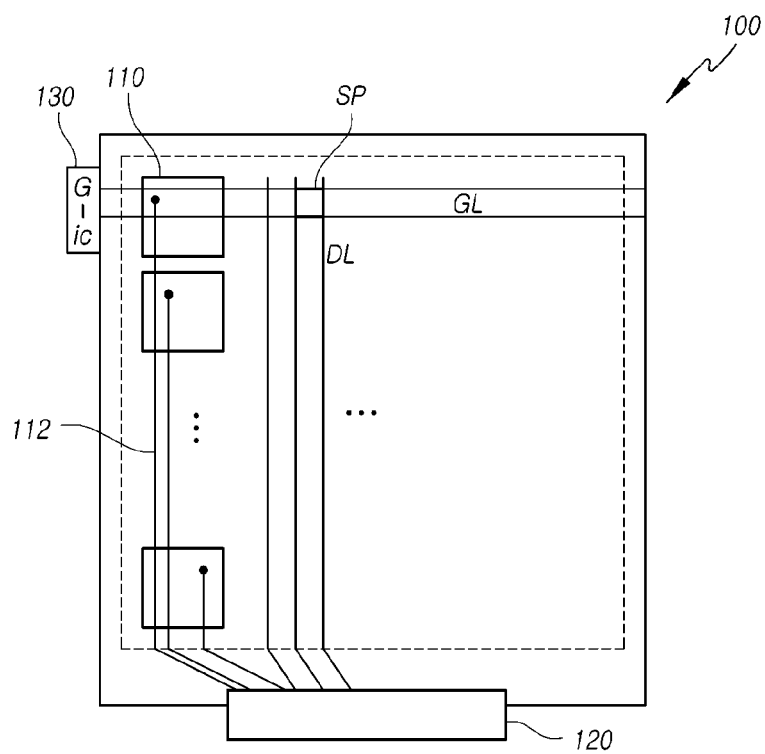
FIG. 1 is a plan view of a touch integrated display panel to which an example embodiment of the present disclosure can be applied.

Reference will now be made in detail to the some embodiments of the present disclosure, examples of which are illustrated in the accompanying drawings.

When reference numerals refer to components of each drawing, although the same components are illustrated in different drawings, the same components are referred to by the same reference numerals as possible. Further, if it is considered that description of related known configuration or function may cloud the gist of the present disclosure, the description thereof will be omitted.

Further, in describing components of the present disclosure, terms such as first, second, A, B, (a), and (b) can be used. These terms are used only to differentiate the components from other components. Therefore, the nature, order, sequence, or number of the corresponding components is not limited by these terms. It is to be understood that when one element is referred to as being "connected to" or "coupled to" another element, it may be directly connected to or directly coupled to another element, connected to or coupled to another element, having still another element "intervening" therebetween, or "connected to" or "coupled to" another element via still another element.

FIG. 1 is a plan view of a touch integrated display panel to which an example embodiment of the present disclosure can be applied.

A display panel to which the present disclosure can be applied is a touch-type display panel and more specifically a touch integrated (in-cell) display panel including touch electrodes therein.

The display panel is manufactured by bonding a first substrate, serving as an array substrate on which a pixel area defined at an intersection between a gate line and a data line and including two or more thin film transistors is formed, and a second substrate, serving as an upper substrate on which a black matrix and/or a color filter layer are formed.

Meanwhile, the display panel includes a plurality of common electrodes within an active area. Such a common electrode is used to apply a common voltage Vcom to each pixel so as to apply an electric field to a liquid crystal material due to a potential difference from a pixel electrode.

In a typical display panel, such a common electrode may be formed to have a large planar shape. However, in the touch integrated display panel, the common electrode is also used as a touch electrode for touch sensing. Because the touch electrode may need to be divided for each touch position, the common electrode is divided into a plurality of touch electrodes 110 in the active area as illustrated in FIG. 1.

In this case, a unit of division of the touch electrode may be referred to as a "touch unit sensor", and in the present specification, for convenience, each touch unit sensor may be referred to as a touch electrode.

As illustrated in FIG. 1, the touch integrated display panel is divided into an active area (AA) in a central area and a non-active area NA in a peripheral area, and a plurality of touch electrodes 110 is disposed on the active area.

Each of the plurality of touch electrodes is connected to a data driving circuit or a touch driving circuit (D-IC or T-IC) 120 disposed on one side of the display panel (e.g., a lower portion of FIG. 1) through a touch driving line 112.

The data driving circuit 120 functions as a control unit for sensing a touch position by sensing a capacitance due to a touch operation after applying a specific touch driving signal or touch driving voltage to the plurality of touch electrodes 110.

Also, the plurality of touch electrodes 110 is connected to the touch driving circuit (D-IC) 120 through the touch driving line 112, and a single touch driving line 112 may be generally assigned to each touch electrode as illustrated in FIG. 1. In some cases, two or more touch driving lines may be used for each touch electrode as illustrated in FIG. 2.

Each touch driving line 112 is electrically connected to its corresponding touch electrode as illustrated in FIG. 1. In the data driving circuit 120, a touch driving signal is applied to each touch electrode through a touch driving line 112.

Figure 2:
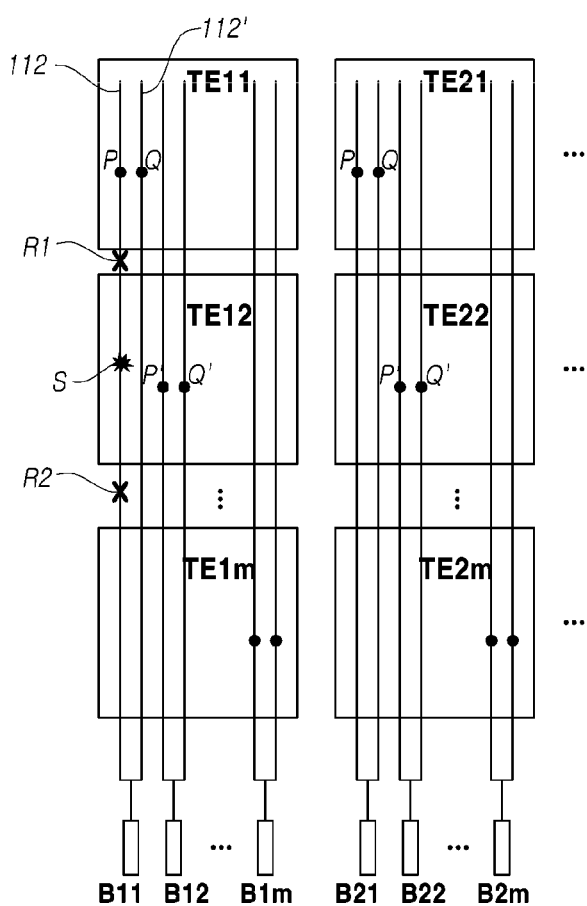
FIG. 2 illustrates an example where two touch driving lines are used for each touch electrode in the display panel of FIG. 1 and also illustrates a short occurring between a touch driving line and another touch electrode and a short-repair status.

FIG. 2 illustrates an example where two touch driving lines are used for each touch electrode in the display panel of FIG. 1, and also illustrates a short occurring between a touch driving line and another touch electrode and a short-repair status.

As shown in FIG. 2, a first touch driving line 112 and a second touch driving line 112' are assigned to a first touch electrode TE11, and the first touch driving line 112 and the second touch driving line 112' are electrically connected to the touch electrode TE11 through contact holes P and Q.

Likewise, two touch driving lines for a second touch electrode TE12 vertically extend on the entire display panel. These two touch driving lines are electrically connected to the second touch electrode TE12 through contact holes P' and Q'.

Meanwhile, as illustrated in FIG. 1, the touch driving line 112 may extend from the data driving circuit 120 to its corresponding touch electrode. However, the touch driving line 112 may extend on the entire area of the display panel, as illustrated in FIG. 2 in order to equalize an electric resistance in all touch driving lines.

That is, if touch driving lines are extended only to their corresponding touch electrodes and electrically connected to those touch electrodes, respectively, as illustrated in FIG. 1, a touch driving line corresponding to the uppermost touch electrode is the longest, and a touch driving line corresponding to the lowermost touch electrode is the shortest, which results in a difference in electric resistance between the touch driving lines.

As described above, a touch input can be recognized by supplying a touch driving voltage to a touch electrode through a touch driving line and then measuring a capacitance change occurring in the touch electrode due to a touch operation. Therefore, it is desirable for all touch driving lines to have the same electric resistance.

Therefore, a structure in which all touch driving lines are formed to be vertically extended on the entire display panel and electrically connected to their corresponding touch electrodes, as illustrated in FIG. 2, may be used. In this case, all the touch driving lines may have the same electric resistance. Thus, touch recognition can be performed consistently.

Also, if a single touch driving line is used for each touch electrode as illustrated in FIG. 1, when a touch driving line has a defect (a short with another touch electrode or a short of the touch driving line), the corresponding touch electrode may not recognize a touch.

Meanwhile, if two or more touch driving lines are assigned and used for each touch electrode as illustrated in FIG. 2, even when a single touch driving line has a defect, touch recognition may be performed. Also, as compared with the structure in FIG. 1, an electric resistance of the touch driving lines is decreased. Thus, touch recognition sensitivity can be improved.

That is, if two or more touch driving lines are used for each touch electrode as illustrated in FIG. 2, and two touch driving lines supply the same touch driving signal to their corresponding touch electrode and then, a capacitance change is measured, an electric resistance of the touch driving lines for the single touch electrode is decreased, and, thus, touch sensitivity can be improved.

For this reason, in a touch-type display panel, a technique of using two or more touch driving lines for each touch electrode may be adopted.

Meanwhile, in the touch-type display panel as illustrated in FIG. 2, there may occur a touch electrode-short defect in which one of the touch driving lines is electrically connected to another touch electrode besides its corresponding touch electrode.

That is, as illustrated in FIG. 2, the first touch driving line 112 and the second touch driving line 112' should be electrically connected only to the first touch electrode TE11, but may include a short area S where the first touch driving line 112 and the second touch driving line 112' are electrically connected to another touch electrode, e.g. the second touch electrode TE12, due to conductive foreign material within the display panel during a manufacturing process of the display panel.

In the present specification, for convenience, another touch electrode except a touch electrode to which two or more touch driving lines need to be connected may be referred to as "the other touch electrode."

As such, if there occurs a short defect between one of the two touch driving lines and the other touch electrode, a repair process of cutting the shorted touch driving line from both sides of the other shorted touch electrode and electrically insulating them may be performed in order to solve the short defect. This process may be referred to as a short-repair process.

That is, as illustrated in FIG. 2, if the first touch driving line 112, which should be connected only to the first touch electrode TE11, has a short defect (area S) in which the first touch driving line 112 is shorted with the other touch electrode, e.g. the second electrode TE12, a short-repair process of cutting the first touch driving line 112 from points R1 and R2 on both sides of the second touch electrode and electrically insulating them is performed.

If the short-repair process is performed, a touch driving signal cannot be input through the first touch driving line 112 shorted with the other touch electrode. As a result, the touch driving signal is normally applied to the first touch electrode only through the second touch driving line 112'. Therefore, the first touch electrode TE11 can sense a touch.

However, according to the short-repair process as illustrated in FIG. 2, an electric resistance of the touch driving line to the touch electrode corresponding to the cut touch driving line becomes different from an electric resistance of a touch driving line in another touch electrode due to the repair.

That is, in the example as illustrated in FIG. 2, the first touch driving line 112 is cut by the short-repair, and, thus, an electric resistance of all of the touch driving lines assigned to the first touch electrode TE 11 includes only an electric resistance of the second touch driving line 112', and not the reduced electric resistance of the first touch driving line 112 in parallel with the second touch driving line 112'. Therefore, as compared with the electric resistance of another touch electrode which is decreased by two touch driving lines, an electric resistance of the touch driving lines for the first touch electrode is almost two times higher than an electric resistance of the touch driving lines in another touch electrode.

As such, if an electric resistance of the touch driving lines in the short-repaired touch electrode is different from that of another touch electrode, the short-repaired touch electrode has a different touch sensing sensitivity from the other touch electrodes. Therefore, the touch sensitivity uniformity on the entire display panel may deteriorate.

Examples of the present embodiments may provide a touch-type display panel in which two or more touch driving lines are assigned to each touch electrode and a connection line connecting the two or more touch driving lines is provided on both sides of the touch electrode and a short-repair method of the display panel. Thus, the present example embodiments may provide a way to reduce (and possibly minimize) a change in electric resistance of the touch driving lines even after a short-repair.

Figure 3:
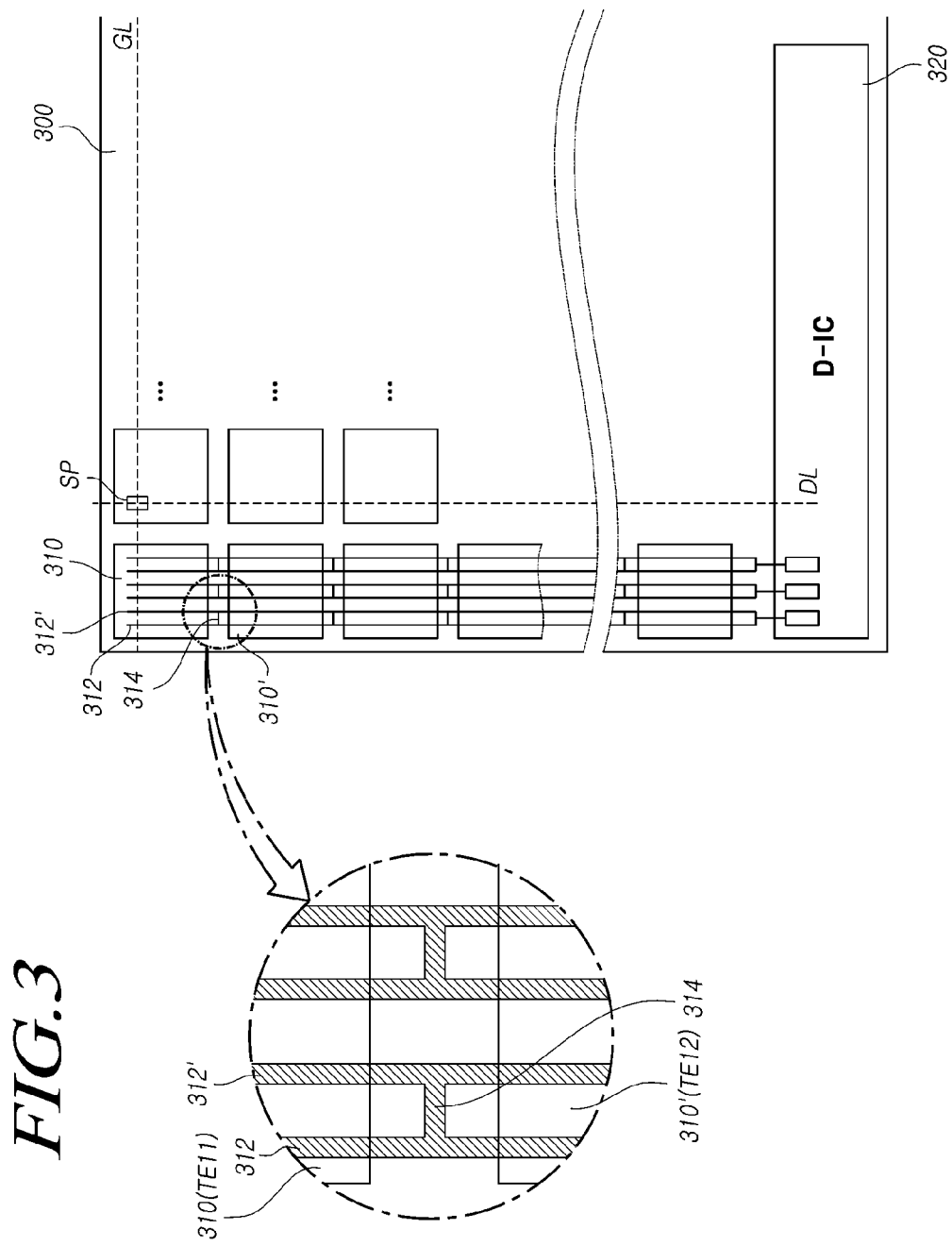
FIG. 3 is a plan view of a touch-type display panel according to an example embodiment of the present disclosure in which two or more touch driving lines are assigned to each touch electrode and a connection line electrically connecting the two or more touch driving lines is included on both sides of each touch electrode.

FIG. 3 is a plan view of a touch-type display panel according to an example embodiment of the present disclosure in which two or more touch driving lines are assigned to each touch electrode and a connection line electrically connecting the two or more touch driving lines is included on both sides of each touch electrode.

Figure 6:
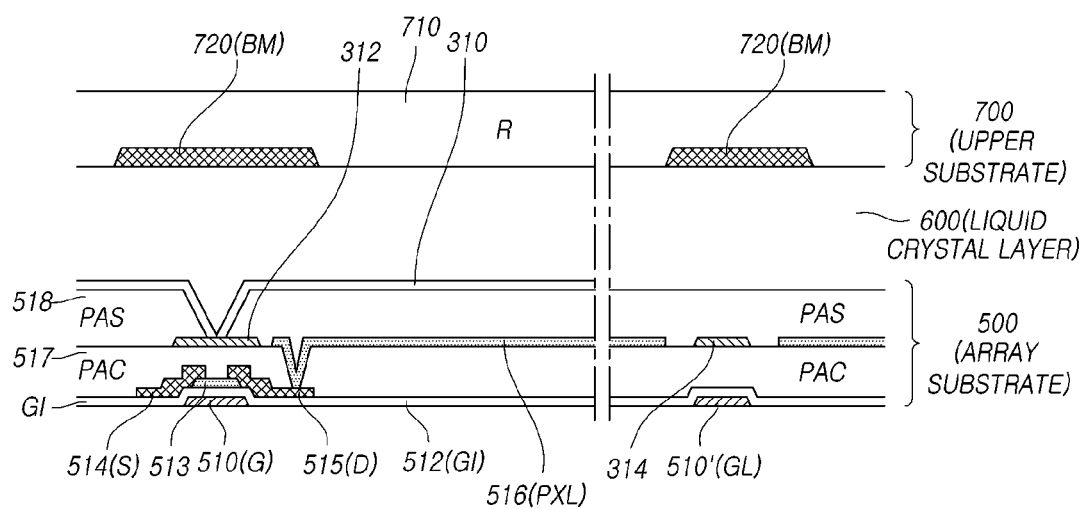
FIG. 6 is a cross-sectional view taken along line A-A' of FIG. 5A and illustrates positions of the touch driving lines and the connection line therefor according to the present example embodiment.

The touch-type display panel according to the present example embodiment includes an array substrate as illustrated in FIG. 3 and FIG. 6. On the array substrate, a plurality of gate lines GL and a plurality of data lines DL are disposed, and sub-pixels SP serving as pixel areas are defined by the gate lines and the data lines. The array substrate 500 includes a plurality of touch electrodes 310 disposed to cover a plurality of the sub-pixels, two or more touch driving lines 312 and 312' connecting an inner or outer touch driving unit and each of the touch electrodes, and a connection line 314 disposed on both sides of each of the touch electrodes and configured to electrically connect the two or more touch driving lines.

That is, the touch-type display panel according to a present example embodiment is an in-cell touch-type display panel including touch electrodes therein and using two or more parallel touch driving lines configured to apply a touch driving signal to each touch electrode. In this structure, a connection line electrically connecting two or more touch driving lines disposed in parallel on both sides of each touch electrode is further provided. Thus, as will be described below, even if there occurs a short defect in which a touch driving line is shorted with the other touch electrode and a short-repair process is performed thereto, it may be possible to reduce and/or minimize a change of an electric resistance of the short-repaired touch driving line.

Hereinafter, a detailed configuration of the touch-type display panel according to a present example embodiment will be described in detail.

The touch-type display panel according to the present example embodiment may be manufactured by bonding a first substrate, serving as an array substrate on which a sub-pixel area SP defined at an intersection between a gate line GL and a data line DL and including one or more thin film transistors is formed, and a second substrate, serving as an upper substrate on which a black matrix and/or a color filter layer are formed.

As illustrated in FIG. 3, the display panel according to the present example embodiment is divided into an active area (AA) in a central area and a non-active area NA in a peripheral area, and a plurality of touch electrodes 310 is disposed on the active area.

Further, a touch driver 320 may be disposed inside or outside the touch-type display panel. The touch driver 320 is a control unit functioning to sense a touch by applying a touch driving signal or a touch driving voltage to touch electrodes and measuring the amount of change of a capacitance in each of the touch electrodes.

The touch driver 320 may be implemented as being combined with a data driving circuit (D-IC) configured to apply a source signal to data lines. In the following description, for convenience, the touch driver and the data driving circuit (D-IC) will be used as having the same meaning, but are not limited thereto, and in other embodiments, the touch driver 320 may be implemented separately from the data driving circuit.

Meanwhile, as described above, the touch electrode 310 is also used as a common electrode for applying a common voltage Vcom to each sub-pixel, and each touch electrode is disposed so as to cover a plurality of sub-pixels.

Also, each of a plurality of touch electrodes 310 may be connected to the data driving circuit or data driver 320 on one side of the display panel (e.g. lower portion of FIG. 1) through the two or more touch driving lines 312 and 312'.

In the following description, for convenience, each touch electrode 310 will be described as being connected to the two touch driving lines 312 and 312' disposed in parallel. However, the number of touch driving lines connected to a single touch electrode is not limited to two but may be three or more.

As illustrated in FIG. 3, a first touch electrode 310 on the upper right side is connected the two touch driving lines 312 and 312', and a second touch electrode 310' right under the first touch electrode 310 is connected to other two touch driving lines.

That is, as described above, in the touch-type display panel according to the present example embodiment, each touch electrode is connected to two or more touch driving lines, and, thus, an electric resistance of the touch driving lines is decreased and touch sensing sensitivity can be improved.

Further, the touch driving lines 312 and 312' according to the present example embodiment are extended not only to their corresponding touch electrode, but from one side to the other side of the display panel (e.g., from a lower side where the D-IC is disposed to an upper side in FIG. 3) and connected to their corresponding touch electrode through contact holes.

As such, touch driving lines connected to all of the touch electrodes may be set to have the same length, and, thus, the touch driving lines for the touch electrodes may be maintained at the same electric resistance, which results in uniform touch performance.

Meanwhile, as will be further described below with reference to FIG. 6, the touch driving lines 312 and 312' and the connection line 314 according to the present example embodiment are formed as a different layer from a pixel electrode and the touch electrode. For example, the touch driving lines 312 and 312' and the connection line 314 may be formed as a metal layer referred to as an M3 layer disposed between a pixel electrode layer and a touch electrode layer.

Meanwhile, the display panel may include a gate driver (GIC) 130 (as shown in FIG. 1) directly formed on the display panel as a gate driving circuit in the non-active area NA on one side of the display panel (e.g., on the left of FIG. 1), but the example embodiments of the present disclosure are not limited thereto.

Examples of a touch method in the touch-type display panel may include a mutual capacitance method (Mutual Cap.) in which a touch electrode is divided into a driving touch electrode Tx and a sensing touch electrode Rx where a capacitance difference between the driving touch electrode Tx and the sensing touch electrode Rx is measured, and a self-capacitance method (Self Cap.) in which touch electrodes are disposed on the same plane in a lattice shape without division of a transmittance and reception where a self-capacitance is measured.

Hereinafter, a driving method of the touch-type display panel according to an example embodiment will be generally described.

A driving mode where the panel operates to display an image may be referred to as a "display driving mode" and a mode where the panel functions as a touch screen panel may be referred to as a "touch driving mode".

The display driving mode and the touch driving mode can be divided according to time.

First, in the display driving mode, the data driving circuit D-IC supplies a data voltage Vdata for display to the plurality of data lines DL.

Meanwhile, when the panel is in the display driving mode, the gate driver sequentially supplies a scan signal for display to the plurality of gate lines GL so as to switch a transistor and thus display an image.

In the display driving mode, a common voltage Vcom is applied to the touch electrode 110 functioning as a common electrode through the two touch driving lines 312.

Meanwhile, in the touch driving mode, the touch driver 320 within the data driving circuit D-IC applies a touch driving signal Vtouch_vcom to all or some of a plurality of touch electrodes 310 connected thereto through the two touch driving lines 312 and 312'.

Herein, the touch driving signal Vtouch_vcom may also be referred to as "touch sensing signal," "touch sensing voltage," or "touch driving voltage."

Meanwhile, the touch driver 320 senses sensing data (for example, a capacitance, the amount of change of capacitance, a voltage, or the like) measured by each touch electrode by analyzing signals received through the respective touch electrodes 310. Thus, the touch driver 320 can detect a touch or non-touch and touch coordinates.

As such, the panel of the touch-type display device according to the present example embodiment is driven by repeating the display driving mode and the touch driving mode. The timing of the display driving mode and the timing of the touch driving mode can be controlled in response to control signals output from a timing controller or a touch controller, or in some cases, can be controlled through cooperation between the timing controller and the touch controller.

Meanwhile, a display device including a touch-type display panel according to an example embodiment may use a capacitance touch method in which a touch or non-touch and touch coordinates are detected on the basis of a change of a capacitance through a plurality of touch electrodes (for example, horizontal direction electrodes and vertical direction electrodes) formed on the display panel, as a touch sensing method.

The capacitance touch method may be classified into, for example, a mutual capacitance touch method and a self-capacitance touch method.

The mutual capacitance touch method, as an example of the capacitance touch method, enables touch electrodes disposed in one direction, among the horizontal direction electrodes and vertical direction electrodes, to function as Tx electrodes (also referred to as driving electrodes) to which a driving voltage is applied, and electrodes disposed in the other direction to function as Rx electrodes (also referred to as sensing electrodes) sensing the driving voltage and forming a capacitance with the Tx electrodes. The mutual capacitance touch method detects a touch or non-touch and touch coordinates on the basis of a change of a capacitance (mutual capacitance) between a Tx electrode and an Rx electrode depending on the presence or absence of a pointer, such as a finger or a pen.

The self-capacitance touch method, as another example of the capacitance touch method, includes forming a capacitance (self-capacitance) between each touch electrode and a pointer, such as a finger or a pen, measuring a capacitance value between each touch electrode and the pointer, such as a finger or a pen, depending on the presence or absence of the pointer, and detecting a touch or non-touch and touch coordinates on the basis of the measured capacitance value. Unlike the mutual capacitance touch method, the self-capacitance touch method concurrently applies and senses a driving voltage (touch driving signal Vtouch_vcom) through each touch electrode. Therefore, in the self-capacitance touch method, the Tx electrodes and the Rx electrodes are not distinguished.

A touch-type display panel to which the present disclosure can be applied may employ one of the above-described two capacitance touch methods (mutual capacitance touch method and self-capacitance touch method). In description of present example embodiments described herein, for convenience in explanation, the self-capacitance touch method is employed.

Meanwhile, the plurality of touch electrodes 310 mentioned herein function as "touch electrodes." to all or portions of which a touch driving signal is applied, in the touch driving mode as described above. In the display driving mode, the plurality of touch electrodes 310 also function as "common electrodes," to which a common voltage Vcom is applied and which are configured to form liquid crystal capacitors together with pixel electrodes disposed on the panel.

Meanwhile, in the touch-type display panel according to the present example embodiment, a plurality of gate lines GL and a plurality of data lines DL are formed. A single pixel or sub-pixel SP is formed at an intersection between a gate line and a data line.

The single touch electrode 310 has an area that may cover several tens of (sub-)pixels. Therefore, the number of touch electrodes is smaller than the number of data lines.

The touch-type display panel according to the present example embodiment may further include an upper substrate or color filter substrate disposed on one side of the array substrate. This upper substrate or color filter substrate may include a black matrix BM as a light shielding unit disposed to cover around a sub-pixel (e.g., at the areas between sub-pixels), and may be provided in addition to the array substrate (first substrate) on which thin film transistors, sub-pixels, pixel electrodes, and touch electrodes are disposed as described above.

In this case, one or more of the touch driving lines 312 and 312' and the connection line 314 may be disposed to be overlapped with the black matrix of the upper substrate. Details thereof will be described below with reference to FIG. 5.

As illustrated in the enlarged view of FIG. 3, the touch-type display panel according to the present example embodiment further includes the connection line 314 electrically connecting a pair of touch driving lines corresponding thereto on both sides of each touch electrode.

The connection line 314 may be formed as a different layer from a touch electrode and a pixel electrode, and formed between the adjacent touch electrodes in a plan view.

Figure 4:
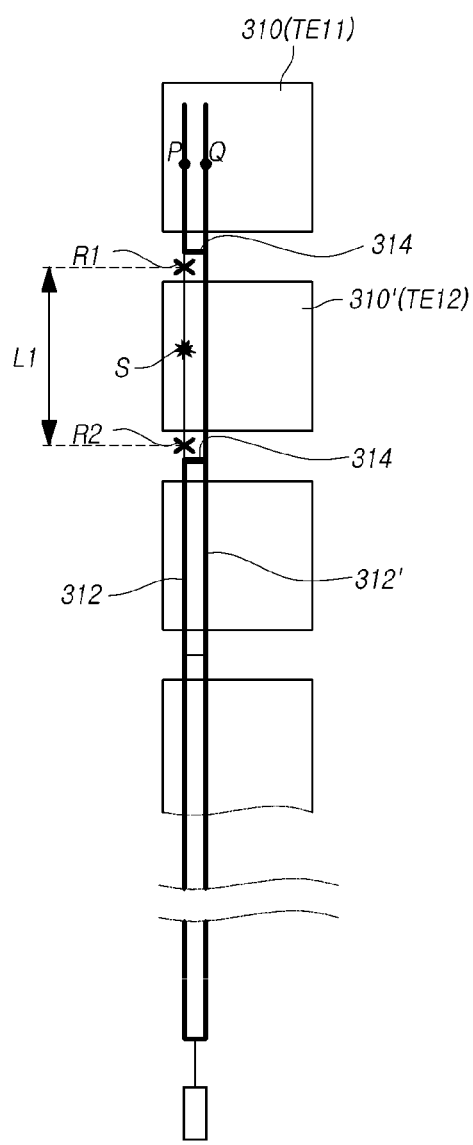
FIG. 4 illustrates the principle of reducing a change in electric resistance after a short-repair in a case where a connection line for touch driving lines is used according to an example embodiment of the present disclosure.

FIG. 4 illustrates the principle of reducing (and possibly minimizing) a change in electric resistance after a short-repair in a case where a connection line for touch driving lines is used according to an example embodiment of the present disclosure.

FIG. 4 illustrates an example where a short defect occurs in which the first touch driving line 312 among the two touch driving lines 312 and 312' assigned to the first touch electrode (TE11) 310 is shorted with another touch electrode, e.g. the second touch electrode (TE12) 310'.

If the short defect occurs, a short-repair process is performed. Thus, the shorted portion of the first touch driving line 312 is cut from points R1 and R2 on both sides of the second touch electrode (TE12) 310' so as to be electrically insulated from the remainder of the first touch driving line 312.

In this case, the remaining first touch driving line 312 except the cut portion R1-R2 is electrically connected to the second touch driving line 312' by the connection line 314.

As a result, after the short-repair process according to the present example embodiment is performed, in the display panel, the entire second touch driving line 312', the remaining part of the first touch driving line 312 except the cut part of the first touch driving line (portion R1-R2), and the two connection lines disposed on both sides of the other touch electrode where the short defect occurs, e.g. the second touch electrode 310', are connected to each other and thus form a touch driving signal application line to the first touch electrode 310.

In other words, after the short-repair process according to the present example embodiment is performed, the touch-type display panel includes sub-pixels defined by gate lines and data lines, a plurality of touch electrodes disposed to cover a plurality of the sub-pixels, a touch driving line unit including the first touch driving line 312 and the second touch driving line 312' connecting an inner or outer touch driving unit and each of the touch electrodes, and a connection line disposed on both sides of each of the touch electrodes and configured to electrically connect the first and second touch driving lines. If there occurs a short in which the first touch driving line is electrically connected to the other touch electrode (TE2) 310' in addition to its corresponding touch electrode (TE1) 310, the shorted first touch driving line is cut from both sides of the other shorted touch electrode. As a result, the entire second touch driving line 312', the remaining part of the first touch driving line except the cut part of the first touch driving line portion R1-R2, and the connection lines 314 disposed on both sides of the other touch electrode (TE2) 310' are electrically connected to each other, and the cut part of the first touch driving line portion R1-R2 is electrically floated.

Therefore, as compared with the structure in FIG. 2, after the short-repair process, a change of an electric resistance of the touch driving line can be reduced (and possibly minimized) by the connection lines 314.

That is, if a short-repair is performed in the structure as illustrated in FIG. 2, the first touch driving line 112 as one of the two touch driving lines is completely separated from the data driver D-IC, and, thus, an electric resistance of all touch driving lines for the repaired touch electrode is almost two times higher than an electric resistance of touch driving lines for the other normal touch electrode.

However, if the connection line 314 connecting the two touch driving lines is provided according to the present example embodiment, even when a short-repair is performed, an electric resistance is decreased only by the amount corresponding to the cut portion (R1-R2 in FIG. 4) of the shorted first touch driving line 312.

That is, the remaining portion of the first touch driving line 312 except the cut portion is electrically connected to the second touch driving line 312' by the connection line 314, and, thus, a decrease in electric resistance may be reduced and/or minimized.

The cut portion has a far smaller length than the whole length of the shorted touch driving line 312, and, thus, a decrease in electric resistance caused by the short-repair may be very insignificant. Therefore, even after the short-repair process, an electric resistance of touch driving lines for all touch electrodes can be maintained uniformly. As a result, it is possible to suppress a change of touch performance caused by the short-repair.

Figure 5A:
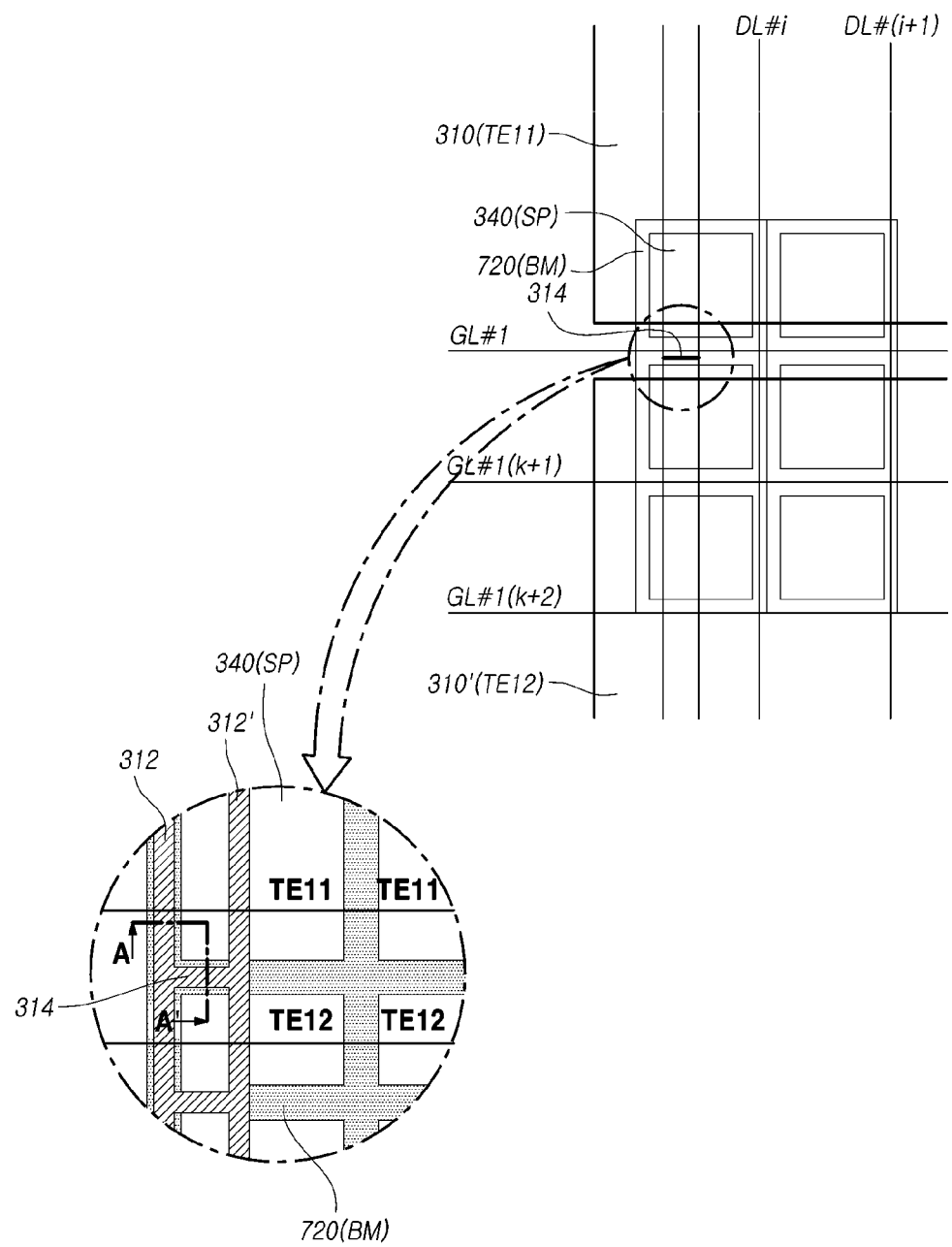
FIGS. 5A and 5B are plan views illustrating a position of a connection line for touch driving lines according to an example embodiment of the present disclosure.
Figure 5B:
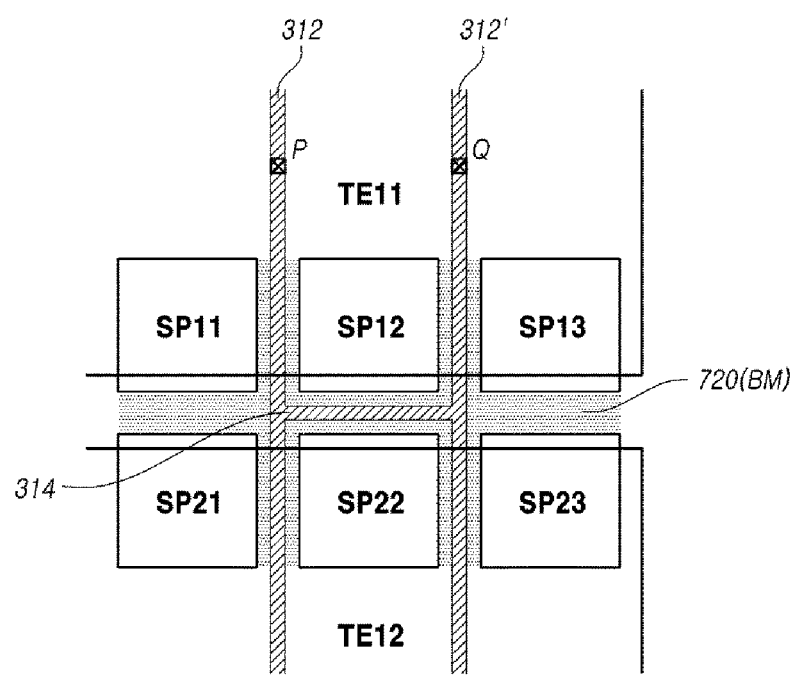

FIGS. 5A and 5B are plan views illustrating a position of a connection line for touch driving lines according to an example embodiment of the present disclosure, and FIG. 6 is a cross-sectional view taken along line A-A' of FIG. 5A and illustrates positions of the touch driving lines and the connection line therefor according to the present example embodiment.

As illustrated in FIG. 6, a touch-type display panel according to the present example embodiment includes an array substrate 500 on which a thin film transistor, a pixel electrode, and a touch electrode are disposed and an upper substrate 700 disposed above the array substrate.

The upper substrate 700 may also be referred to as a second substrate or a color filter substrate, and includes a black matrix 720 as a light shielding unit disposed around a sub-pixel and defining an opening of a pixel and a color filter 710.

The black matrix 720 may refer to a light shielding unit disposed on an area which does not output an image, such as a gate line, a data line, a thin film transistor, and the like, among the sub-pixel areas.

The black matrix 720 is disposed to surround a predetermined area of an opening of each sub-pixel or pixel, as illustrated in FIGS. 5A and 5B.

Meanwhile, as illustrated in FIGS. 5A and 5B, the connection line 314 according to the present example embodiment may be disposed to be overlapped with the black matrix 720 formed on the upper substrate.

As illustrated in FIGS. 5A and 5B, the touch electrodes (TE11 and TE12) 310 are formed to cover a plurality of sub-pixels (SP) 340, and the black matrix 720 of the upper substrate is disposed on an edge of each sub-pixel.

In this structure, the connection line 314 is disposed under the black matrix 720, as illustrated in FIG. 5A and FIG. 5B, and thus overlapped with the black matrix 720 in a plan view.

Further, the first touch driving line 312 as one of the two touch driving lines may also be disposed to be overlapped with the black matrix 720, as illustrated in FIG. 5A. Otherwise, all of the two touch driving lines may be disposed to be overlapped with the black matrix 720, as illustrated in FIG. 5B.

For example, as illustrated in FIG. 5B, the first touch electrode TE11 is formed to cover sub-pixels SP11, SP12, SP13, and the like, and the second touch electrode TE12 is formed to cover sub-pixels SP21, SP22, SP23, and the like. The black matrix 720 is disposed around each sub-pixel, and the two touch driving lines, e.g., the first touch driving line 312 and the second touch driving line 312' for the first touch electrode TE11, are connected to the first touch electrode TE11 through contact holes P and Q, respectively.

In this structure, all of the first touch driving line 312, the second touch driving line 312', and the connection line 314 are disposed to be overlapped with the black matrix 720 formed between the sub-pixels.

As will be described below, in a present example embodiment, the touch driving lines and the connection line are formed as separate metal layers (M3 layers) unlike a pixel electrode or a touch electrode (common electrode) formed of a transparent conductive material, and thus function to block leakage of light generated in a sub-pixel.

That is, the touch driving lines and the connection line according to the present example embodiment are opaque and disposed to be overlapped with a light shielding area, e.g., the black matrix 720, of the upper substrate, and, thus, it may be possible to suppress a decrease in sub-pixel opening ratio caused by the connection line.

Also, the connection line 314 according to the present example embodiment is disposed on both sides of each touch electrode and in a space between the adjacent touch electrodes.

As described above, the touch driving lines 312 and 312' and the connection line 314 are formed as different layers from the touch electrode. Therefore, the connection line is not necessarily disposed between the adjacent touch electrodes in a plan view.

However, if the connection line 314 is disposed to be overlapped with a part of the touch electrode, an unnecessary parasitic capacitance may be generated between the connection line 314 and the touch electrode. The parasitic capacitance may cause degradation of touch performance or pixel characteristics.

Therefore, because the connection line 314 according to the present example embodiment is disposed on both sides of each touch electrode and in a space between the adjacent touch electrodes, it may be possible to suppress the generation of a parasitic capacitance.

FIG. 6 is a cross-sectional view taken along line A-A' of FIG. 5A and illustrates the layout relationship among the thin film transistor, the touch driving line 312, and the black matrix 720 on the left, and illustrates the layout relationship between the connection line 314 and the black matrix 720 on the right.

In the description of the present example embodiment, for convenience, a side on which a gate electrode of a substrate is formed is referred to as a "lower part" and a side on which a touch electrode (common electrode) is formed is referred to as an "upper part." That is, the upper substrate's (color filter substrate's) side of the display panel is an "upper part," and the array substrate's side is a "lower part."

In the touch-type display panel to which an example embodiment of the present disclosure is applied, a structure of a pixel area on which the touch electrode 310 is formed is next described.

With reference to FIG. 6, in the pixel area, the array substrate includes a gate line formed on the first substrate and a gate electrode 510 extended from the gate line, and may include a gate insulation film 512 formed on the entire area including an active area and a non-active area on the gate electrode 510 and a semiconductor pattern 513 formed on the gate insulation film 512 so as to be overlapped with a part of the gate electrode 510.

The semiconductor pattern 513 constitutes an active area of a thin film transistor TFT and may be formed of amorphous silicon (a-Si) or an oxide semiconductor such as zinc oxide (ZnO)-based oxide, for example, indium gallium zinc oxide (IGZO), zinc tin oxide (ZTO), zinc indium oxide (ZIO), but is not limited thereto.

Also, the array substrate may include a data line intersecting with the gate line with the gate insulation film (GI) 512 interposed therebetween. The thin film transistor TFT may include a source electrode 514 extended from the data line and a drain electrode 515 facing the source electrode 514, and a pixel electrode 516 formed on the entire pixel area defined by an intersection between the gate line and the data line and connected to the drain electrode of the thin film transistor TFT.

Further, an organic protection layer (PAC) 517 functioning as an interlayer insulation layer and protection layer is formed on the gate insulation layer (GI) 512 on which the data line and the thin film transistor TFT are formed.

The organic protection layer (PAC) 517 may be formed of a material such as photo-acryl, acrylate, polyamide, benzocyclobutene (BCB), but is not limited thereto.

The touch driving line 312 is formed of a different material on a different layer from a data metal layer on the organic protection layer (PAC) 517, so as to be overlapped with the data line.

Herein, the touch driving line 312 may be formed of low resistance metal such as aluminum (Al), aluminum-neodymium (AlNd), copper (Cu), molybdenum (Mo), molybdenum-titanium (MoTi), chromium (Cr), etc. or an alloy thereof, but it is not limited thereto.

A metal layer forming the touch driving line 312 may be referred to as a first metal layer or an M3 metal layer.

Then, an inorganic protection layer (PAS) 518 functioning as an interlayer insulation layer and additional protection layer is formed on the touch driving line 312 and the pixel electrode 516.

The inorganic protection layer (PAS) 518 may be formed of an inorganic insulating material such as silicon nitride (SiNx) or silicon oxide (SiO$_2$), but it is not limited thereto.

The touch electrode 310 according to the present example embodiment is formed on the inorganic protection layer (PAS) 518. The touch electrode 310 also functions as an electrode for applying a common voltage Vcom and thus may also be referred to as a common electrode.

Meanwhile, the touch electrode (common electrode) 310 may be electrically connected to the touch driving line 312 through a contact hole penetrating the inorganic protection layer (PAS) 518.

In this case, the gate line or a gate metal layer of the gate electrode or a source/drain metal layer may be a material including at least one of aluminum (Al), aluminum alloy (AlNd), copper (Cu), copper alloy, molybdenum (Mo) and molybdenum alloy (MoTi) as a metal material having a low resistance characteristic.

Also, in the present example embodiment, the touch electrode (common electrode) 310 may be a transparent electrode, and may be formed of a transparent conductive material having a relatively high work function, for example, metal oxide such as indium-tin-oxide (ITO) or indium-zinc-oxide (IZO), and a combination of metal and oxide such as ZnO:Al or SnO$_2$:Sb.

Further, the gate insulation film (GI) 512 and the inorganic protection layer (PAS) 518 may be formed of an inorganic insulating material such as silicon oxide (SiO$_2$) or silicon nitride (SiNx), but are not limited thereto, and the gate insulation film (GI) 512 and the inorganic protection layer (PAS) 518 may also be formed of other electrically insulating materials.

Meanwhile, the right side of FIG. 6 illustrates a cross-sectional view cutting a space between the adjacent touch electrodes in which the gate line 510 is disposed on a lower side and the gate insulation film 512, the organic protection layer 517, and the inorganic protection layer 518 are disposed thereon, and the connection line 314 formed as an M3 metal layer is disposed between the organic protection layer and the inorganic protection layer.

According to the example embodiment illustrated in FIG. 6, the touch driving line 312 and the connection line 314 are formed as the same layer, e.g. the first metal layer or the M3 metal layer. Therefore, while the M3 metal layer is patterned on the organic protection layer 517, the touch driving line 312 and the connection line 314 may be formed at the same time.

Furthermore, the upper substrate 700 including the black matrix 720 and the color filter 710 is formed above the array substrate 500.

In this case, the touch driving line 312 and the connection line 314 are directly under the black matrix 710 of the upper substrate. As a result, the touch driving line 312 and the connection line 314 are formed to be overlapped with the black matrix 710 of the upper substrate.

In the example embodiment illustrated in FIG. 6, the organic protection layer 517 and the inorganic protection layer 518 have been described as being sequentially formed with the pixel electrode 516 and the M3 metal layer interposed therebetween, but are not limited thereto. Only the inorganic protection layer or the organic protection layer may be used, or one protection layer may have a double-layer structure having two or more layers.

FIG. 7 illustrates a connection line for touch driving lines according to another example embodiment of the present disclosure.

In the example embodiments illustrated through FIG. 6, the connection line 314 is formed as the M3 metal layer which is the same layer as the touch driving line 312. However, in the example embodiment illustrated in FIGS. 7A and 7B, the connection line 314 may be formed as a different layer from the touch driving line 312.

Figure 7A:
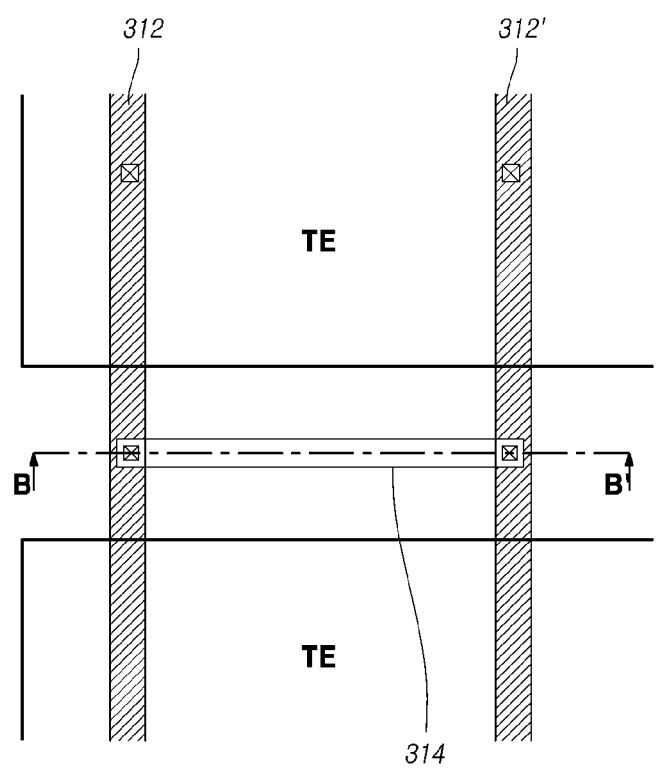
FIGS. 7A and 7B illustrate a connection line for touch driving lines according to another example embodiment of the present disclosure.
Figure 7B:
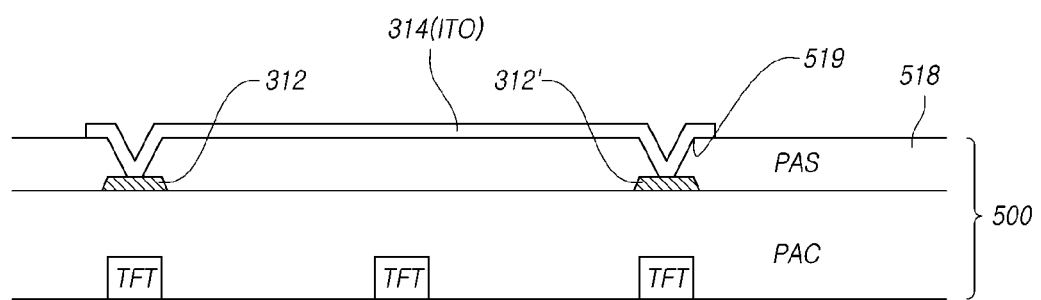

That is, the example embodiment in FIGS. 7A and 7B illustrate that the connection line 314 connecting the two touch driving lines 312 and 312' between both touch electrodes is formed as the same layer as the touch electrodes.

That is, while a touch electrode TE is patterned, the connection line 314 is also formed on both sides of each touch electrode, and the connection line 314 is configured to be electrically connected to the touch driving lines 312 and 312' of the M3 metal layer through a contact hole 519 formed in the inorganic protection layer 518.

According to the example embodiment illustrated in FIG. 7, the connection line 314 is formed of the same transparent conductive material as the touch electrode. Therefore, even if the connection line 314 is not overlapped with a black matrix, it may be possible to suppress a decrease in pixel opening ratio caused by the connection line.

Particularly, the example embodiment illustrated in FIG. 7 may be advantageous when being applied to a display panel without using a black matrix.

Figure 8:
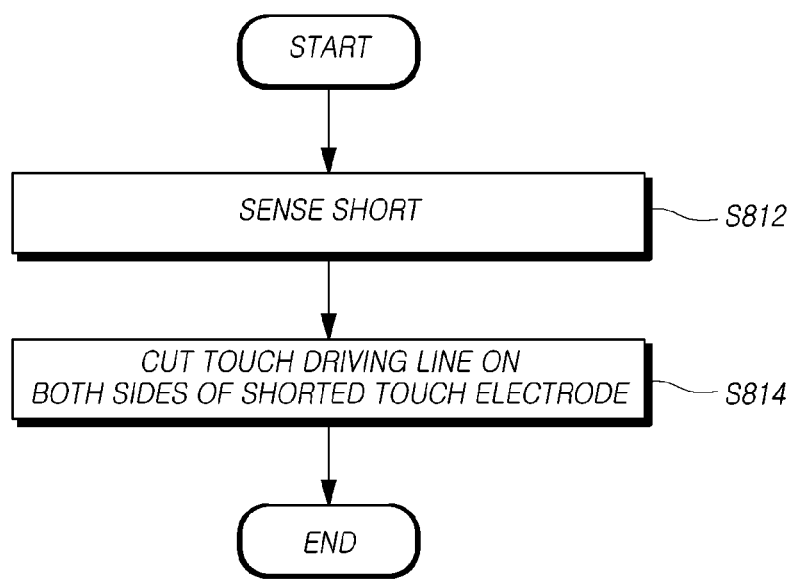
FIG. 8 illustrates a flow of a short-repair process for a display panel including a connection line for touch driving lines according to an example embodiment of the present disclosure.

FIG. 8 illustrates a flow of a short-repair process for a display panel including a connection line for touch driving lines according to an example embodiment of the present disclosure.

A short-repair method of a touch electrode according to the present example embodiment is applied to a touch-type display panel including an array substrate on which a plurality of touch electrodes, a touch driver, two or more touch driving lines connecting the touch driver and the respective touch electrodes, and a connection line disposed on both sides of each touch electrode and electrically connecting the two or more touch driving lines are disposed as illustrated in FIG. 3 through FIG. 6.

For example, the short-repair method may include a short sensing step (S812) of sensing a short in which one of touch driving lines corresponding to one touch electrode is electrically connected to another touch electrode, and a cutting step (S814) of cutting the shorted touch driving line from both sides of the other shorted touch electrode.

In the short sensing step (S812), a short status may be sensed by analyzing a touch signal received through a touch driving line. For example, when a short occurs as illustrated in FIG. 4, a touch sensing signal received through a touch driving line for the second touch electrode TE12 becomes identical to a touch sensing signal received through a touch driving line for the first touch electrode TE11. If such a status is sensed, a short defect as illustrated in FIG. 4 may be sensed.

In the cutting step (S814), the shorted touch driving line is cut from both sides of the other shorted touch electrode by, e.g., laser cutting. Thus, the touch driving line between cutting points on the both sides of the other shorted touch electrode is electrically insulated from another touch driving line. In this case, a laser cutting process or a laser repair process may be used in order to cut two points of the shorted touch driving line, but the present disclosure is not limited thereto.

In this case, the remaining touch driving line except the cut portion is electrically connected by the connection line. Thus, it is possible to reduce and/or minimize a change of an electric resistance of all touch driving lines caused by the short-repair.

Accordingly, even after the short-repair, there may be almost no change in touch performance.

According to the above-described example embodiments of the present disclosure, it may be possible to suppress degradation of touch performance caused by a short between a touch electrode and a touch driving line in a touch-type display panel.

For example, in a touch integrated display device in which two or more touch driving lines are used for each touch electrode, a connection line electrically connecting the two or more touch driving lines is provided. Thus, it may be possible to reduce and/or minimize a change in electric resistance after a repair for a shorted touch electrode.

Also, in a touch-type display panel in which two or more touch driving lines are assigned to each touch electrode and electrically connected by a connection line, if a short occurs between a touch electrode and a touch driving line for another touch electrode, the shorted touch driving line is cut from both sides of the shorted touch electrode, and, thus, a change in electric resistance of the shorted touch driving line can be reduced and/or minimized even after a repair. Therefore, it may be possible to suppress degradation of touch performance.

It will be apparent to those skilled in the art that various modifications and variations can be made in the a touch-type display panel and short-repair method thereof of the present disclosure without departing from the spirit or scope of the disclosure. Thus, it is intended that the present disclosure cover the modifications and variations of this disclosure provided they come within the scope of the appended claims and their equivalents.

What is claimed is:

1. A touch-type display panel, comprising:
   an array substrate including:
      a plurality of sub-pixels defined by gate lines and data lines;
      a plurality of touch electrodes disposed to cover the sub-pixels;
      two or more touch driving lines that electrically connect a touch driving circuit to a respective one of the touch electrodes; and
      a connection line disposed on both sides of the one of the touch electrodes and configured to electrically connect the two or more touch driving lines,
      wherein the two or more touch driving lines each separately extend from one side to the other side of the array substrate.

2. The touch-type display panel according to claim 1, wherein:
   the array substrate further includes:
      one or more thin film transistors disposed in respective sub-pixels; and
      a pixel electrode connected to a drain electrode of the thin film transistor; and
   the connection line and the touch driving lines are a metal layer between the pixel electrode and the touch electrodes.

3. The touch-type display panel according to claim 1, further comprising:
   an upper substrate disposed on one side of the array substrate and including a black matrix disposed to define openings of the sub-pixels,
   wherein the connection line is disposed to be overlapped with the black matrix.

4. The touch-type display panel according to claim 3, wherein the touch driving lines are disposed to be overlapped with the black matrix.

5. The touch-type display panel according to claim 1, wherein:
   the array substrate further includes:
      one or more thin film transistors disposed in respective sub-pixels; and
      a pixel electrode connected to a drain electrode of the thin film transistor; and
   the connection line is disposed on a different layer from the touch driving lines.

6. The touch-type display panel according to claim 5, wherein the connection line is disposed on the same layer as the one of the touch electrodes and electrically connected to the two or more touch driving lines through contact holes.

7. The touch-type display panel according to claim 2, wherein the connection line is disposed in a space between two adjacent ones of the touch electrodes.

8. A short-repair method of a touch-type display panel including an array substrate on which a plurality of touch electrodes, a touch driver, two or more touch driving lines electrically connecting the touch driver to a respective one of the touch electrodes, and a connection line disposed on both sides of the one of the touch electrodes and electrically connecting the two or more touch driving lines, the short-repair method comprising:
   sensing a short in which one of the touch driving lines corresponding to the one of the touch electrodes is electrically connected to another touch electrode; and
   cutting the shorted touch driving line from both sides of the other shorted touch electrode.

9. The short-repair method according to claim 8, wherein:
   the array substrate further includes:
      one or more thin film transistors disposed in respective sub-pixels defined by gate lines and data lines; and
      a pixel electrode connected to a drain electrode of the thin film transistor; and
   the connection line and the touch driving lines are a metal layer between the pixel electrode and the touch electrodes.

10. The short-repair method according to claim 9, wherein the touch-type display panel further includes:
    an upper substrate disposed on one side of the array substrate and including a black matrix disposed to define openings of the sub-pixels,
    wherein the connection line is disposed to be overlapped with the black matrix.

11. The short-repair method according to claim 8, wherein the cutting the shorted touch driving line is performed through one or more of a laser cutting process and a laser repair process.

12. A touch-type display panel, comprising:
    an array substrate including:
       a plurality of sub-pixels defined by gate lines and data lines;
       a plurality of touch electrodes disposed to cover the sub-pixels;
       a first touch driving line and a second touch driving line electrically connecting a touch driving circuit to a respective one of the touch electrodes; and
       a connection line disposed on both sides of the one of the touch electrodes and configured to electrically connect the first and second touch driving lines,
    wherein the array substrate includes a short in which the first touch driving line corresponding to the one of the touch electrodes is electrically connected to another touch electrode, and
    wherein the shorted first touch driving line is cut from both sides of the another touch electrode such that the entire second touch driving line, a remaining part of the first touch driving line other than the cut part of the first touch driving line, and a connection line disposed on both sides of the other touch electrode are electrically connected to each other and the cut part of the first touch driving line is electrically floated.

13. The touch-type display panel according to claim 1, wherein a same touch driving signal is applied to the one of the touch electrodes through both of the two or more touch driving lines.

14. The touch-type display panel according to claim 1, wherein the two or more touch driving lines are in parallel to each other.

* * * * *